INVENTOR.
J. WARNE CARTER
BY
ATTORNEY

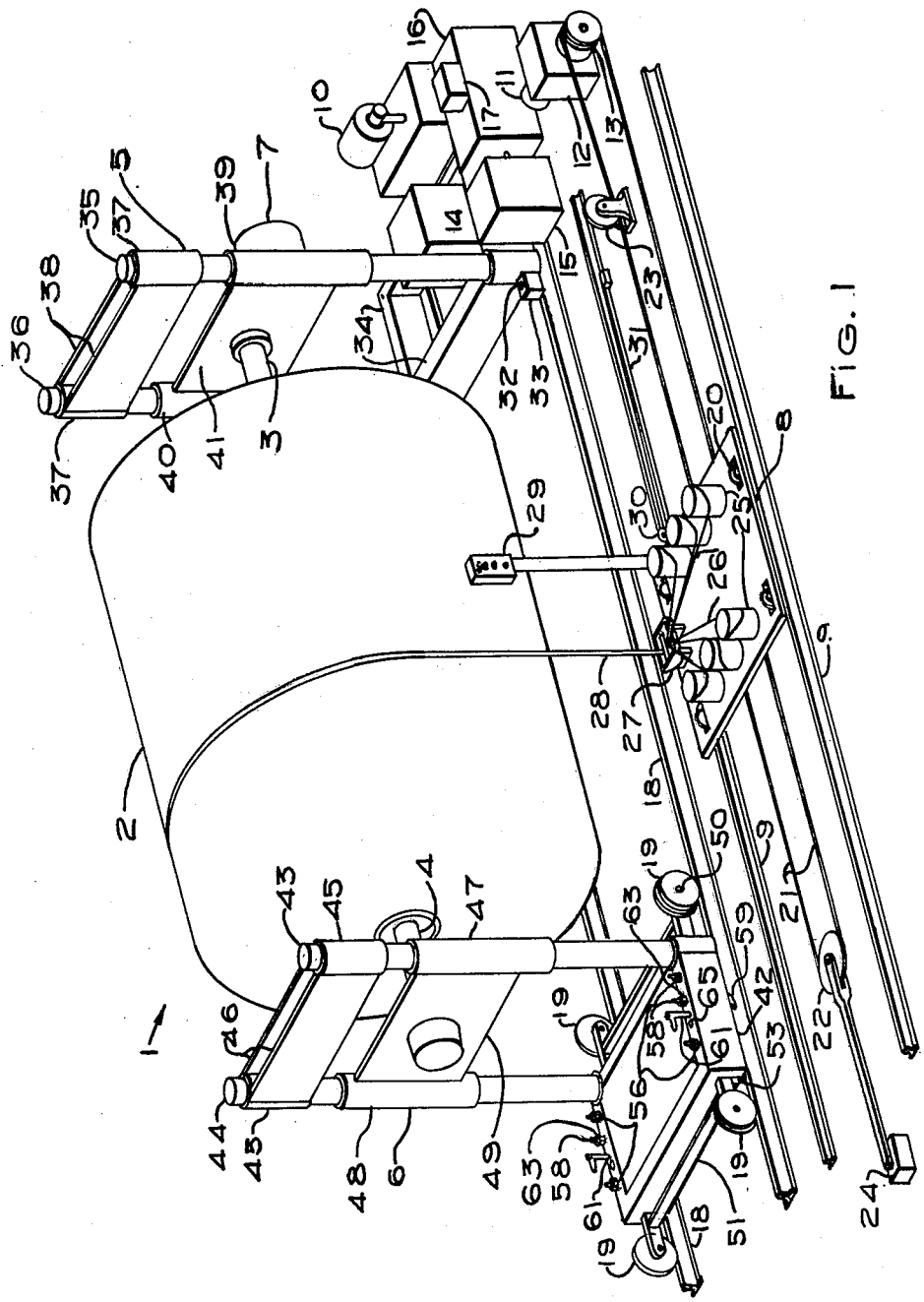

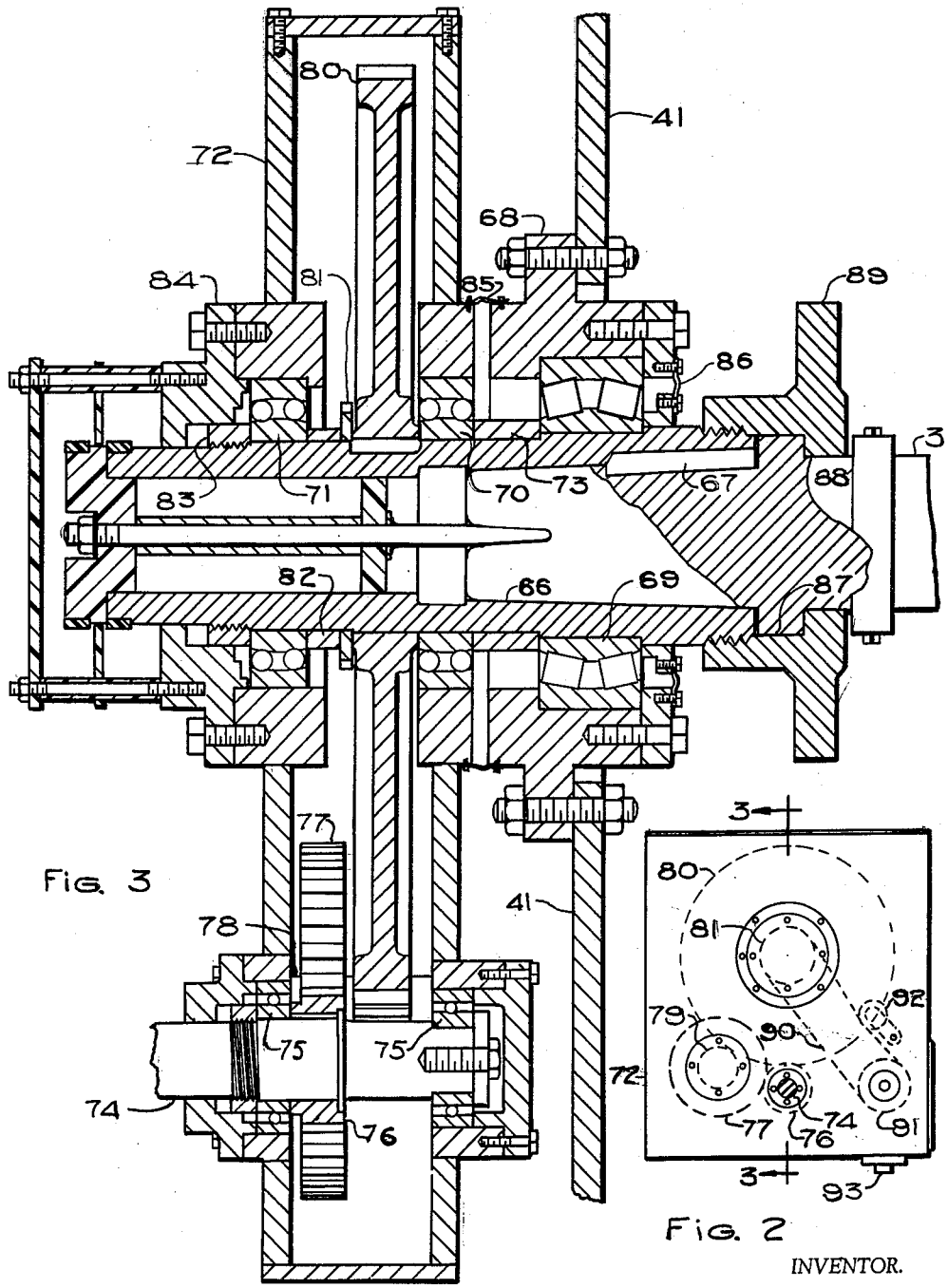

Oct. 8, 1963 J W. CARTER 3,106,504
APPARATUS FOR WINDING RESIN-IMPREGNATED STRANDS ON
A MANDREL INVOLVING A WINDING CONTROL PATTERN
Filed May 8, 1959 5 Sheets-Sheet 4
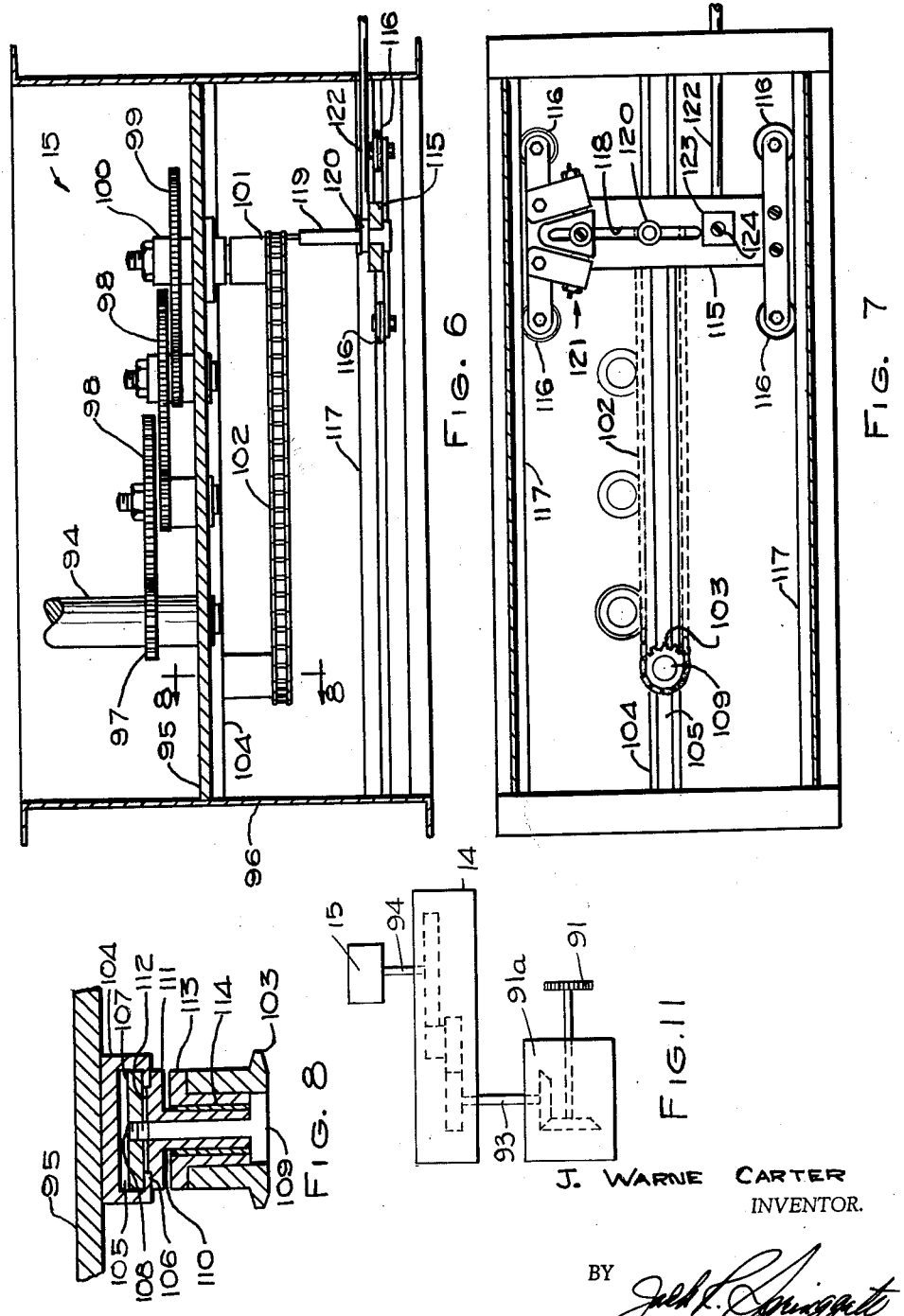
J. WARNE CARTER
INVENTOR.
BY 
ATTORNEY Oct. 8, 1963  J W. CARTER  3,106,504
APPARATUS FOR WINDING RESIN-IMPREGNATED STRANDS ON
A MANDREL INVOLVING A WINDING CONTROL PATTERN
Filed May 8, 1959  5 Sheets-Sheet 5

INVENTOR.
J. WARNE CARTER
BY
ATTORNEY 3,106,504
APPARATUS FOR WINDING RESIN-IMPREG-NATED STRANDS ON A MANDREL INVOLV-ING A WINDING CONTROL PATTERN
J Warne Carter, Oklahoma City, Okla., assignor to Black, Sivalls & Bryson, Inc., Kansas City, Mo., a corporation of Delaware
Filed May 8, 1959, Ser. No. 811,939
8 Claims. (Cl. 156—351)

The present invention relates generally to apparatus for winding strands into any shape capable of being supported at each end by spindles within rotary bearings. More specifically, the present invention relates to an improved apparatus for winding glass fiber strands which have been impregnated with a suitable binding agent into a generally cylindrical shape.

Tanks and other types of generally cylindrical containers which are usually constructed of metal can, for special uses, be wound from resin impregnated strands of glass fiber to secure such advantages as being corrosion resistant and having a high strength to weight ratio. In applications of vessels or containers in which it is desired to maintain a high strength to weight ratio the pattern of the winding of the impregnated strands of glass fiber, and therefore the control of the winding pattern, is of primary importance.

Prior to the present invention apparatus of various types have been used for the winding of strands but a majority of the machines are designed to advance only one strand width for each revolution of the winding mandrel. Such a machine, when adapted to the winding and impregnation of glass fibers, will form a container having a very high strength in hoop tension but the longitudinal strength of such container relies for all practical purposes solely upon the strength of the binding agent. In some winding machines which were known prior to the present invention and which could produce a winding pattern having improved longitudinal strength the backlash in the gears of the machines causes deviations in the winding patterns which hinder the development of a container having the desired strength in all directions. This effect of backlash becomes particularly pronounced in the winding of containers of large diameters, for example, diameters of four feet and larger.

Another disadvantage of many of the known machines which rely upon a servo system to control the winding pattern is that they do not have a differential mechanism of sufficient sensitivity to control an exact winding pattern. Further disadvantages of winding machines of the prior art are that they do not provide a movable carriage capable of carrying the necessary amount of strands of glass fiber together with a bath of the desired binding agent for the winding of large containers, they do not provide a carriage which allows the operator of the machine to ride the carriage and check its operation from his station thereon and they do not provide self aligning bearing mountings fo rthe spindles at each end of the mandrel on which the container is to be wound.

Therefore, the primary object of the present invention is to provide an improved apparatus for winding articles from strands of glass fibers and impregnating the glass fiber strands with a suitable binding agent. A further object of the present invention is to provide an apparatus for winding strands of glass fibers impregnated with a suitable binding agent into a desirable article having a very accurate glass pattern. A still further object of the present invention is to provide an improved control system for a winding machine. Still another object of the present invention is to provide an improved carriage for a winding machine having provision for carryng the spools of glass fibers, the bath of binding agent and an operator for checking the winding operation. Another object of the present invention is to provide adjustable self aligning mountings for the spindles of the mandrel of the winding apparatus of the present invention.

In accomplishing these and other objects of the present invention, I have provided improved apparatus illustrated in the accompanying drawings wherein:

FIG. 1 is a schematic perspective view of a complete winding machine embodying the novel features of the present invention.

FIG. 2 is an end view illustrating the orientation of parts of the headstock mounting.

FIG. 3 is a detail sectional view taken along lines 3—3 in FIG. 2.

FIG. 6 is a plan view of the pattern mechanism of the present invention.

FIG. 7 is a front view of the pattern mechanism illustrated in FIG. 6.

FIG. 8 is a detail sectional view taken along lines 8—8 in FIG. 6.

FIG. 11 is a schematic representation of a drive chain portion of the apparatus disposed between its mandrel and pattern control components.

Figure 4:
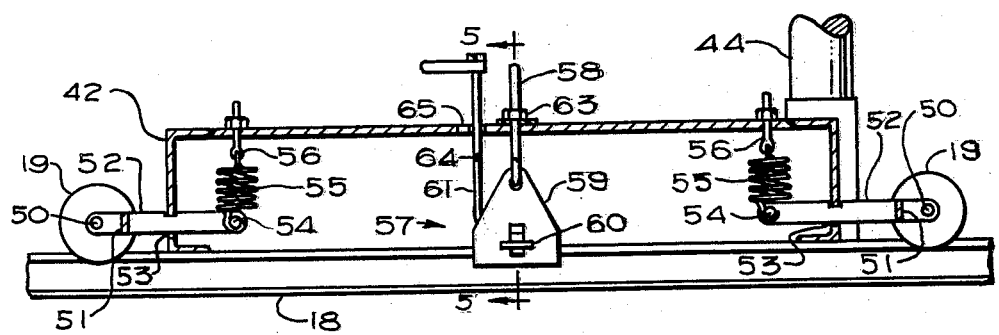
FIG. 4 is a detail longitudinal sectional view of the tailstock.

Referring more in detail to the drawings:

Winding machine 1 as illustrated in FIG. 1 comprises mandrel 2 having spindles 3 and 4 mounted in headstock 5 and tailstock 6 respectively, mandrel drive 7 mounted on headstock 5, carriage 8 mounted on suitable rails 9, hydraulic pump 10, hydraulic motor 11 connected to carriage 8 through gear train 12 and carriage drive 13, gear train 14 connecting mandrel drive 7 to pattern mechanism 15 which is connected through differential mechanism 16 and servo mechanism 17 to hydraulic motor 11, all as hereinafter more fully explained. Headstock 5 and tailstock 6 are mounted on rails 18. Tailstock 6 is provided with wheels 19 to facilitate the use of different lengths of mandrel 2 whereby articles of widely varying lengths may be wound on winding machine 1.

Carriage 8 is provided with wheels 20 which ride upon rails 9 allowing carriage 8 to move freely along rails 9 for the length of mandrel 2. Driving cable 21 is endless and extends from carriage drive 13 to the underneath side of carriage 8 to which driving cable 21 is fixedly secured, through pulley 22 which is secured to anchor block 24 and back beneath carriage 8 to carriage drive 13. Sheave 23 is provided to maintain the portion of drive cable 21 which extends from the upper side of carriage drive 13 below the level of carriage 8 and to provide a straight horizontal pull on carriage 8.

Spools 25 of glass fiber strands are positioned on carriage 8 as shown and may vary in number without departing from the principles of the present invention. For example, if it is desirable to wind on mandrel 2 a structure using a large number of glass fiber strands, the number of spools may be increased to twelve or more if necessary. Strands 26 from each spool 25 extend through resin bath 27 wherein strands 26 are combined to form band 28 which comprises a plurality of glass fibers completely wetted with the resin or binder contained within resin bath 27. A wiper arm (not shown) may be desirable to remove the excess resin or binder from band 28. Such a wiper arm, if used, should be adjustable to provide the desired tension on band 28 while the winding is proceeding. Care also should be taken in the mounting of spools 25 on carriage 8 to prevent excess friction which could cause excessive tension in band 28. Sufficient friction should be present in the mounting of spools 25 on carriage 8 to prevent spools 25 from turning when carriage 8 is stopped suddenly during the winding operation.

As shown in FIG. 1 carriage 8 is provided with control box 29 to allow the operator of winding machine 1 to ride on carriage 8 and to check the operation of carriage 8 during the winding. Control box 29 is connected through reel 30 and electric cable 31 to mandrel drive 7 or other control mechanism (not shown) such as a clutch so that an operator can stop, start and vary the relative movements of mandrel 7 and carriage 8.

Headstock 5 is secured in position on rails 18 by anchor bolts 32 through anchor lugs 33 which are secured by welding or other suitable securing means to base 34 of headstock 5. Standards 35 and 36 are secured in base 34 and extend upwardly to a height substantially above the level of spindle 3. Sleeves 37 are positioned around the upper ends of standards 35 and 36 and are connected by stiffening plates 38. Stiffening plates 38 are welded or otherwise suitably secured to sleeves 37 which are in turn secured to standards 35 and 36 by set screws (not shown) or other suitable securing means. Sleeves 39 and 40 are positioned on standards 35 and 36 respectively at a position above base 34 and below sleeves 37 to support spindle 3 at the desired level as hereinafter more fully described. Support plate 41 is secured between sleeves 39 and 40 to support spindle 3 of mandrel 2 and mandrel drive 7 as hereinafter more fully described in the discussion of FIGS. 2 and 3.

Figure 5:
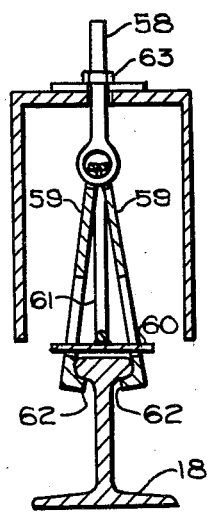
FIG. 5 is a detail sectional view of the tailstock clamping device taken along lines 5—5 in FIG. 4.

Tailstock 6 is similar to headstock 5 except that it is provided with wheels 19 to allow for the use of mandrels of varying lengths. Tailstock 6 comprises base 42, upright standards 43 and 44, sleeves 45 joined by stiffening plates 46, sleeves 47 and 48 and support plate 49 housing a spherical roller bearing (not shown) similar to the spherical bearing structure associated with headstock 5, to be discussed. As best shown in FIGS. 4 and 5 wheels 19 are mounted on axles 50 which are connected to support frame 51. Arms 52 are secured to support frame 51 and extend through slots 53 cut in base 42, pivoting thereunder and are connected to spring bar 54 and to eye bolts 56 which are secured to base 42. Springs 55 should be selected to be sufficiently strong to support tailstock 6 on wheels 19 until clamp structure 57 secures base 42 to rails 18.

Clamping structure 57 is composed of eye bolt 58, clamping plate 59 and clamping key 60 to which arm 61 is secured. As shown, clamping plates 59 are secured in the eye of eye bolt 58 and extend downwardly around rail 18. Clamping plates 59 are both provided with inwardly flaring flange portions 62 which are formed to engage the under sides of the upper flanges of rail 18. Clamping plates 59 are also slotted to receive clamping key 60. Clamping key 60 is notched so that it can engage either the inside or outside surfaces of clamping plates 59. Eye bolt 58 extends through base 42 and nut 63 is threaded onto eye bolt 58 above base 42. Arm 61 is provided with a flat notch 64 which is adapted to catch in slot 65 in base 42 whereby when arm 61 is raised to a height at which it will slide into slot 65, clamping key 60 will have raised sufficiently to maintain clamping plates 59 out of contact with rail 18. With arm 61 removed from slot 65, clamping key 60 may be pushed downwardly so that it forces clamping plates 59 into engagement with rail 18. To tighten clamping plates 59 on rail 18 it is only necessary to tighten nut 63 on eye bolt 58 and hold clamping key 60 down thereby preventing clamping plates 59 from slipping off rail 18. Thus, with clamping key 60 down, the tightening of nut 63 on eye bolt 58 will cause flange portions 62 of clamping plates 59 to engage rail 18 and cause base 42 to become seated on rail 18 whereby tailstock 6 will be firmly positioned during the winding operation of winding machine 1.

As best illustrated in FIG. 3 spindle 3 of mandrel 2 is positioned within spindle receiving member 66 which is provided with the same degree of taper as spindle 3. Also, key 67 is used to hold spindle 3 in fixed position with respect to rotary motion of member 66. Member 66 is connected to flange 68 through spherical bearing 69. Bearings 70 and 71 are also positioned around member 66 and are connected to gear box 72. Spacer 73 is provided to space bearing 70 from spherical bearing 69. Drive shaft 74 extends into gear box 72 and is mounted therein on bearings 75. Drive shaft 74 is connected to mandrel drive 7 and causes pinion 76 to engage and turn gear 77. Gear 77 is mounted on shaft 78 with pinion 79 which engages and turns gear 80 which is keyed onto spindle receiving member 66. Thus, mandrel drive 7 is directly connected to spindle 3 and therefore will rotate mandrel 2. Gear 80, sprocket 81 and spacer 82 are mounted on member 66 between bearings 70 and 71. Nut 83 tightens on member 66 to engage bearing 71 thereby holding gear 80, sprocket 81 and spacer 82 in their respective positions on member 66 within gear box 72. Flange 84 provides a seal for bearing 71 around member 66 and is bolted into gear box 72. Dust seals 85 and 86 are used to protect bearing 70 and spherical bearing 69.

Shoulder 87 forms an integral part of spindle 3. Hammerlug nut 89 is threaded to engage the external threads in member 66 to tighten spindle 3 into member 66. Also, it has been found advantageous to install a removable shoulder 88 on spindle 3 between nut 89 and mandrel 2 to facilitate the removal of spindle 3 from member 66.

Chain 90 as best shown in FIG. 2 engages sprocket 81, sprocket 91 and idler 92 causing sprocket 91 to be turned in proportion to the rotation of mandrel 2. Sprocket 91 is connected through a set of bevel gears 91a to shaft 93 which is connected through gear train 14 and shaft 94 into pattern mechanism 15 as shown in FIG. 6. A schematic representation of the drive connection involving sprocket 91, bevel gears 91a, shaft 93, gear train 14, and shaft 94 is provided in FIGURE 11.

Shaft 94 is connected into partition 95 of pattern box 96 which contains pattern mechanism 15, details of which are illustrated in FIGS. 6, 7 and 8. The connection of shaft 94 into partition 95 should be adapted to allow freedom of rotation of shaft 94. Pinion 97 is secured to shaft 94 and connects through gears 98 to gear 99 on shaft 100. Thus, rotation of shaft 94 responsive to rotation of mandrel 2 will be transmitted to shaft 100 causing shaft 100 to rotate with respect to mandrel 2 at a predetermined rate.

Sprocket 101 is secured to shaft 100 and carries chain 102. Chain 102 also is carried by idler sprocket 103 which is movably mounted to track 104. FIG. 8 details the mounting of idler sprocket 103 in track 104. Track 104 is secured to partition 95 by spot welding or other suitable securing means. Track 104 has a slotted recess 105 having inwardly extending flanges 106. Back-up plate 107 is positioned within slotted recess 105 and has a threaded opening 108 to receive the threaded end of sprocket pin 109. Sprocket pin sleeve 110 is positioned around sprocket pin 109 and has flange 111 engaging flanges 106 of track 104. Also extension 112 of flange 111 is positioned between the inner edges of flanges 106. Idler sprocket 103 is suitably secured to sprocket sleeve 113. Sprocket bushing 114 is provided between sprocket sleeve 113 and sprocket pin sleeve 110 to allow free rotation of idler sprocket 103.

Referring again to FIGS. 6 and 7, pattern carriage 115 is mounted on wheels 116 which ride in tracks 117. Tracks 117 are suitably secured to pattern box 96 as by spot welding. Pattern carriage 115 is provided with slot 118 to receive pin 119. Pin 119 is held in slot 118 by integral flanges 120 which allow pin 119 to slide in slot 118. Pin 119 extends and connects to chain 102 to cause pattern carriage 115 to move with the movement of chain 102. Mechanism 121 provides a spring loading of pattern carriage 115 to maintain wheels 116 in tracks 117 at all times. Rod 122 is connected to pattern carriage 115 by clamping device 123 and screw 124 and extends through pattern box 96 into differential mechanism housing 125 as illustrated in FIG. 10.

From the foregoing it can be seen that rod 122 will be caused to reciprocate in response to the turning of mandrel 2 whereby a pattern for the movement of carriage 8 may be established and controlled as hereinafter more fully described. The movement of pattern carriage 115 is used to simulate the movement of carriage 8. Thus, if it is desired to maintain the same relative speed of movement of carriage 8 but to shorten or lengthen its length of travel, it is only necessary to move idler sprocket 103 in track 104 either away from sprocket 101 (lengthening travel) or closer to sprocket 101 (shortening travel). Further, to change the relative speed of movement of carriage 8 with respect to the movement of mandrel 2 thereby changing the angle at which band 28 is wound upon mandrel 2 it is only necessary to change pinion 97 and gears 98 and 99 or to change the gear ratio being used in gear train 14.

Figure 10:
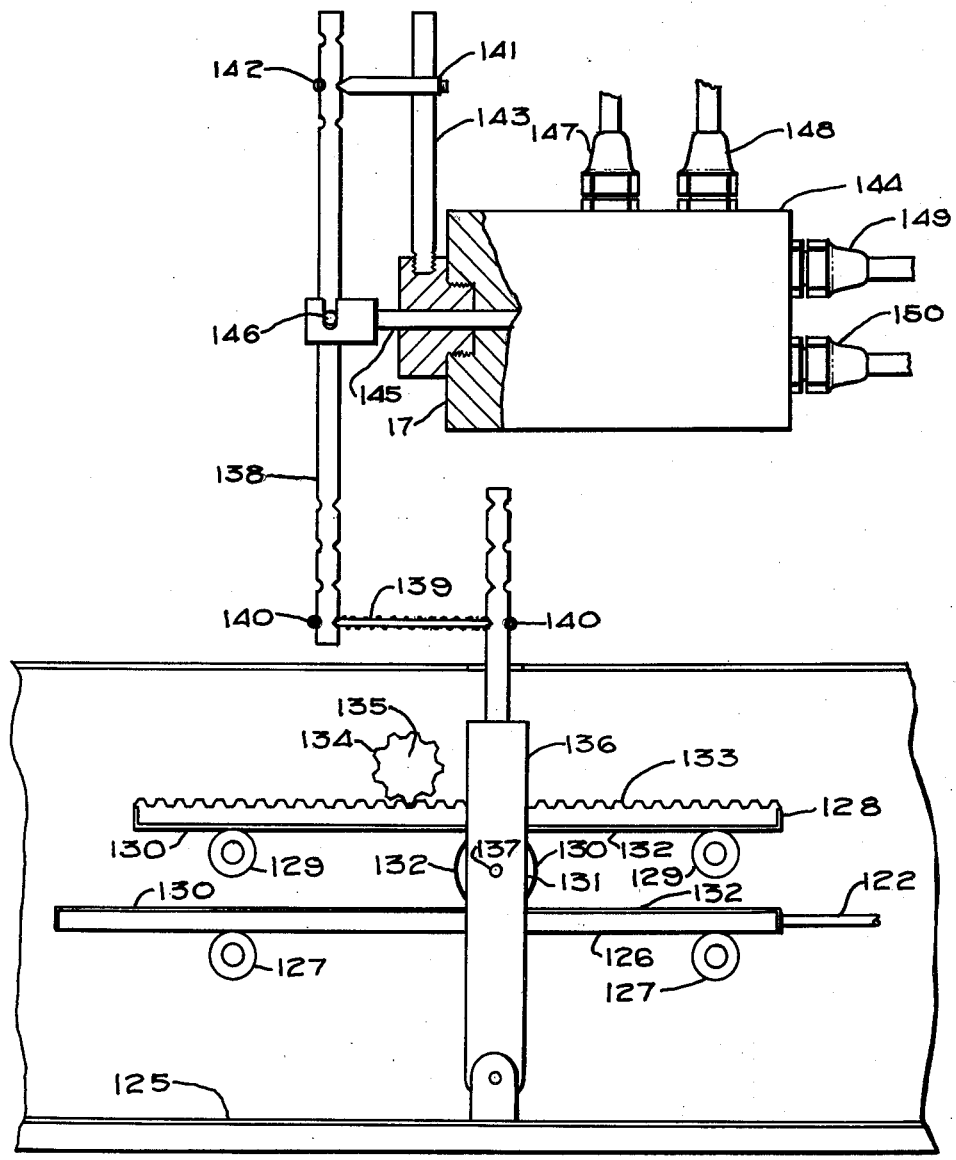
FIG. 10 is a view of a modified form of differential mechanism and the connecting servo mechanism of the present invention.

Rod 122 connects to pattern bar 126 within differential housing 125 as best seen from FIG. 10. It should be noted that FIG. 10 is a rear view of differential mechanism 16 of FIGURE 1 as compared to the front view of pattern mechanism 15 of FIG. 7. Pattern bar 126 is supported on roller mounts 127 which are positioned to maintain pattern bar 126 in a horizontal position without restricting its horizontal movement. Differential bar 128 is similarly mounted on roller mounts 129. Flexible band 130 is connected to the left of pattern bar 126, extends around roller 131 and connects to the left end of differential bar 128. Flexible band 130 is flexible only in bending but should not be flexible with regard to its length. Flexible band 132 connects to the right end of pattern bar 126, extends around roller 131 and connects to the right end of differential bar 128. Flexible band 132 is similar to flexible band 130. Differential bar 128 carries rack 133 which engages pinion 134. Pinion 134 is mounted on shaft 135 which connects into gear train 12 to provide a feed back to differential mechanism 16 indicative of the position of carriage 8.

Roller 131 is mounted to arm 136 by shaft 137. Arm 136 is pivotally mounted to housing 125 by pin 137 and extends upwardly through the upper wall of housing 125. Above housing 125, arm 136 is connected to linkage 138 by pin 139 and spring 140. Linkage 138 is secured to fulcrum pin 141 by spring 142. Fulcrum pin 141 is secured to fulcrum arm 143 which is securely mounted on servo valve body 144. Valve stem 145 of servo mechanism 17 connects in slotted engagement with pin 146 which is secured to linkage 138. Fittings 147 and 148 connect into servo mechanism 17 to provide hydraulic pressure and return lines to and from hydraulic pump 10. Fittings 149 and 150 connect into servo mechanism 17 and connect at their other ends into hydraulic motor 11.

In operation roller 131 and arm 136 will be moved in one direction or the other responsive to the relative movements of pattern bar 126 and differential bar 128. Movement of arm 136 is transmitted to linkage 138 which will cause movement of valve stem 145. Movement of valve stem 145 will position a valve spool (not shown) to connect the pressure fitting 147 from hydraulic pump 10 to one side of hydraulic motor 11 and will connect return fitting 148 to the other or exhaust side of hydraulic motor 11 thereby driving hydraulic motor 11 in the desired direction to properly position carriage 8 with respect to the position of mandrel 2. This positioning of carriage 8 causes the proper pattern to be wound on mandrel 2 whereby the desired longitudinal and hoop strengths are developed in the article being wound.

Figure 9:
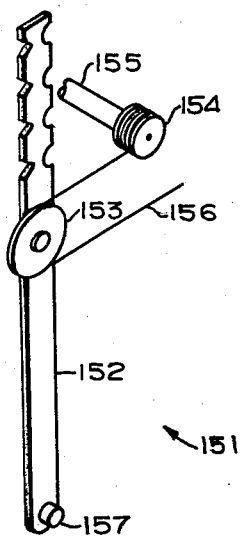
FIG. 9 is a perspective view of the preferred form of differential mechanism of the present invention.

Differential mechanism 151 illustrated in FIG. 9 is a preferred simplified form of mechanism to accomplish the relative positioning of carriage 8 with respect to the rotation of mandrel 2. Differential mechanism 151 comprises arm 152 similar to arm 136 in FIG. 10, sheave 153, cable drum 154 mounted on shaft 155 and cable 156 connected to cable drum 154 and to rod 122 (not shown in FIG. 9). Arm 152 is mounted in pivotable relationship to the differential mechanism housing (not shown) by pin 157. Shaft 155 is connected to gear train 12 in a manner similar to the connection of shaft 135 previously described. Arm 152 should be spring loaded or the linkage to which arm 152 connects should be spring loaded to maintain a tension on cable 156 sufficient to prevent slack therein.

In operation differential mechanism 151 through the movements of shaft 155 and rod 122 will cause servo mechanism 17 to control the movement of carriage 8 with respect to the rotation of mandrel 2.

The operation of winding machine 1 is commenced by starting hydraulic pump 10 and mandrel drive 7. With mandrel 2 securely mounted in the spherical bearing mounts of headstock 5 and tailstock 6, mandrel 2 is ready to be rotated. As previously mentioned, slight misalignment of spindles 3 and 4 will be compensated by these spherical mounts. With such spherical mounts it is suggested that gear box 72 be secured to headstock 5 by a cable or other means allowing the headstock mounting to compensate for any misalignment and still preventing gear box 72 from rotating.

As mandrel 2 begins its rotation, its movement will be transmitted from sprocket 81 through chain 90, sprocket 91, shaft 93, shaft 94, pinion 97, gears 98 and 99 to rotate sprocket 101. The movement of sprocket 101 will cause chain 102 and pattern carriage 115 to move responsive to the rotation of mandrel 2. This movement of pattern carriage 115 is transmitted through rod 122, cable 156, arm 152, linkage 138 and valve stem 145 causing servo mechanism 17 to transmit hydraulic fluid under pressure from hydraulic pump 10 to hydraulic motor 11 which will rotate carriage drive 13 causing carriage 8 to move on rails 9. The movement of carriage 8 will be transmitted through gear train 12 to shaft 155 to rotate cable drum 154 in proportion to the position and movement of carriage 8. Thus, differential mechanism 151 will compare the desired movement of carriage 8 as set by pattern mechanism 15 and the actual movement of carriage 8 as transmitted to cable drum 154 and by movement of arm 152 will control the movement of carriage 8 through servo mechanism 17.

In summary, the illustrated and described differential mechanisms of this application are characterized by a first movable and preferably rotatable, member which transmits actual carriage, i.e. strand, positions. In the FIGURE 9 embodiment, this movable member comprises the sheave 154, while in the FIGURE 10 embodiment this movable member comprises the gear 134. In each embodiment a second movable, and preferably reciprocable, member, i.e. rod 122, transmits a desired carriage or strand position. Each disclosed differential mechanism further includes flexible means having end means connected with the first movable member and other end means operably connected with the second movable member, as well as intermediate means disposed intermediate these end means. These intermediate means, i.e. the loop ends of cable 156 and bands 130 and 132, are deflected from alignment with an axis extending therebetween, as shown in the illustrations. A pivotable member in each differential mechanism is operably connected with the intermediate portion of the flexible means and is adapted to pivot in response to displacement of the intermediate means induced by a difference between movements of the rotatable and reciprocable members reflecting desired and actual strand means positions. In the FIGURE 9 structure, the intermediate portion of the flexible cable 156 loops around and engages the sheave 153 mounted upon pivotal member 152 so as to form this operating connection. In the FIGURE 10 embodiment the connection is formed by the flexible bands 130 and 132 curved around and engaged with the roller 131 mounted upon the pivotable arm 136.

Thus, it may be seen from the foregoing that I have provided an improved apparatus for winding articles from strands of glass fibers impregnated with a suitable binding agent. The winding machine of the present invention is provided with spherical bearing mountings for the mandrel to correct for any misalignment. The apparatus of the present invention also utilizes rails as the basic foundation for the carriage and the headstock and tailstock of the machine in place of the usual expensively machined ways. Also, the apparatus of the present invention provides a new and improved differential mechanism for comparing the actual and desired movements of the carriage and to control a servo mechanism to correct the actual carriage movements to the desired carriage movements.

What I claim and desire to secure by Letters Patent is:

1. An apparatus for winding strand means on a mandrel, said apparatus comprising:
    a mandrel mechanism mounted for rotating movement;
    a carriage mechanism for supplying strand means to said rotating mandrel mechanism, said carriage mechanism being mounted for movement along the length of said mandrel mechanism;
    a winding-pattern control mechanism;
    first means transmitting from said winding-pattern control mechanism the desired position of strand means being supplied to said mandrel mechanism;
    second means transmitting from said carriage mechanism, the actual position of strand means being supplied to said mandrel mechanism;
    a differential mechanism adapted to compare said desired and actual strand means positions;
    and operating means for correlating the operation of said mandrel and carriage mechanisms in response to said comparison of desired and actual strand means position;
    said differential mechanism including;
        a first movable member comprising at least a portion of said first means,
        a second movable member comprising at least a portion of said second means,
        flexible means disposed between said first movable member and said second movable member, said flexible means having end means operably connected with said first movable member and other end means operably connected with said second movable member, and intermediate means disposed intermediate said end means and deflected from alignment with an axis extending therebetween, and
        a third movable member operably connected with said intermediate means of said flexible means and adapted to move in response to displacement of said intermediate means induced by a difference between movements of said first and second movable members reflecting desired and actual strand means positions,
        said third movable member being operably connected with said operating means and adapted to actuate said operating means in response to said difference.

2. An apparatus as described in claim 1 and including a plurality of strand-bearing spool means mounted on said carriage mechanism; means on said carriage mechanism for resin impregnating strands extending from said spool means; and guide means on said carriage mechanism for aligning said impregnated strands to form a band of strands.

3. An apparatus as described in claim 1 including means for supporting said mandrel mechanism comprising:
    a head stock,
    a tail stock moveable toward and away from said head stock,
    spherical support bearings in said head stock and said tail stock;
    a spindle extending from each end of said mandrel mechanism, said spherical support bearings having spindle receiving means whereby one end of said mandrel is supported by said head stock and the other end of said mandrel is supported by said tail stock,
    and means for releasably clamping said moveable tail stock in position so as to enable said mandrel mechanism to be supported between said head stock and said tail stock.

4. A device for winding resin impregnated filaments onto a mandrel comprising:
    a rotatable mandrel;
    means supporting said mandrel;
    a motor connected to said mandrel to rotate said mandrel;
    a carriage having means for resin impregnating and guiding filaments being wound on said mandrel;
    a carriage drive;
    said carriage drive being connected to said carriage to cause said carriage to reciprocate longitudinally of said mandrel;
    carriage drive control means;
    a differential mechanism for actuating said carriage drive control means;
    variable pattern, winding control means for selectively varying winding patterns;
    first means transmitting the desired position of said carriage, with respect to the rotation of said mandrel, from said variable pattern, winding control means to said mechanism;
    second means transmitting the actual position of said carriage to said mechanism;
    and means within said differential mechanism mechanically comparing the desired position with the actual position of said carriage, said carriage drive control means operating in response to said comparison to position said carriage with respect to the rotation of said mandrel;
    said differential mechanism including;
        a reciprocable member comprising at least a portion of said first means,
        a rotatable member comprising at least a portion of said second means,
        flexible means disposed between said rotatable member and said reciprocable member, said flexible means having end means operably connected with said reciprocable member and other end means operably connected with said rotatable member, and intermediate means disposed intermediate said end means and deflected from alignment with an axis extending therebetween, and
        a pivotable member operably connected with said intermediate means of said flexible means and adapted to pivot in response to displacement of said intermediate means induced by a difference between movements of said rotatable and reciprocable members reflecting desired and actual strand means positions,
        said pivotable member being operably connected with said carriage drive control means and adapted to actuate said control means in response to said difference.

5. A device for winding resin impregnated filaments onto a mandrel as set forth in claim 4 wherein said mechanism actuating said carriage drive control means comprises:
  an arm pivotally secured near one end and comprising said pivotable member;
  a sheave mounted near the center portion of said arm,
  a rotatable cable drum, said cable drum comprising said rotatable member;
  a cable comprising said flexible means and extending from said drum around said sheave to said reciprocable member transmitting the desired position of said carriage with respect to the rotation of said mandrel,
  the end of said arm away from the end which is pivotally secured being connected to said carriage drive control means.

6. A device for winding resin impregnated filaments onto a mandrel as set forth in claim 4 wherein said mechanism actuating said carriage drive control means comprises:
  an arm pivotally secured near one end and comprising said pivotable member;
  a roller rotably mounted near the center portion of said arm,
  a pair of bars mounted for movement at substantially right angles to said arm,
  means interconnecting said bars and said arm, said means including two flexible bands comprising said flexible means, one band extending from one end of one bar and passing around said roller to engage the corresponding end of the other bar, and the other band extending from the other end of said one bar and passing around said roller to engage the corresponding other end of said other bar,
  means connecting one of said bars to said reciprocable member transmitting the desired position of said carriage with respect to the rotation of said mandrel,
  means connecting the other of said bars to said rotatable member transmitting the actual position of said carriage,
  and means connecting the end of said arm away from the end which is pivotally secured to said carriage drive control means.

7. A device for winding resin impregnated filaments onto a mandrel as set forth in claim 4, wherein said variable pattern, winding control means comprises:
  a carriage simulating member mounted on wheels for reciprocal movements,
  means mechanically connecting said member to said mandrel to cause said member to move in response to rotation of said mandrel whereby the desired position of said carriage is simulated.

8. A device for winding resin impregnated filaments onto a mandrel as set forth in claim 7 wherein said means mechanically connecting said member to said mandrel comprises:
  a gear train extending from said mandrel driving motor to a drive sprocket,
  an idler sprocket,
  a chain connected around said drive sprocket and said idler sprocket, and
  means connecting said member to said chain.

References Cited in the file of this patent

UNITED STATES PATENTS

| | | |
|---|---|---|
| 2,339,854 | Higgins | Jan. 25, 1944 |
| 2,566,299 | Abbott | Sept. 4, 1951 |
| 2,718,583 | Noland et al. | Sept. 20, 1955 |
| 2,729,268 | Broughton et al. | Jan. 3, 1956 |
| 2,731,376 | Rusch | Jan. 17, 1956 |
| 2,747,649 | Reed | May 29, 1956 |
| 2,798,531 | Jackson | July 9, 1957 |
| 2,843,153 | Young | July 15, 1958 |
| 2,862,541 | Brink | Dec. 2, 1958 |